United States Patent
Kornegay et al.

(10) Patent No.: US 8,996,812 B2
(45) Date of Patent: Mar. 31, 2015

(54) WRITE-BACK COHERENCY DATA CACHE FOR RESOLVING READ/WRITE CONFLICTS

(75) Inventors: Marcus Lathan Kornegay, Charlotte, NC (US); Ngan Ngoc Pham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/487,915

(22) Filed: Jun. 19, 2009

(65) Prior Publication Data

US 2010/0325367 A1    Dec. 23, 2010

(51) Int. Cl.
*G06F 12/00* (2006.01)
*G06F 12/08* (2006.01)

(52) U.S. Cl.
CPC ........ *G06F 12/0804* (2013.01); *G06F 12/0817* (2013.01)
USPC ............................ 711/122; 711/141; 711/143

(58) Field of Classification Search
None
See application file for complete search history.

(56) References Cited

U.S. PATENT DOCUMENTS

| | | | |
|---|---|---|---|
| 5,119,485 A | 6/1992 | Ledbetter, Jr. et al. | |
| 5,313,609 A | 5/1994 | Baylor et al. | |
| 5,615,402 A | 3/1997 | Quattromani et al. | |
| 5,829,038 A | 10/1998 | Merrell et al. | |
| 5,860,158 A | 1/1999 | Pai et al. | |
| 6,304,943 B1 | 10/2001 | Okuyama | |
| 6,360,298 B1 | 3/2002 | Osanai et al. | |
| 6,622,219 B2 | 9/2003 | Tremblay et al. | |
| 6,629,210 B1 * | 9/2003 | Arimilli et al. | 711/141 |
| 6,725,341 B1 | 4/2004 | Peir et al. | |
| 7,334,089 B2 | 2/2008 | Glasco | |
| 2003/0079085 A1 * | 4/2003 | Ang | 711/122 |
| 2006/0059316 A1 | 3/2006 | Asher et al. | |
| 2006/0106991 A1 * | 5/2006 | Franaszek et al. | 711/137 |
| 2007/0136535 A1 | 6/2007 | Rajamony et al. | |
| 2008/0091885 A1 * | 4/2008 | Guthrie et al. | 711/141 |
| 2008/0133844 A1 * | 6/2008 | Ramani et al. | 711/146 |
| 2009/0100225 A1 * | 4/2009 | Matsuki | 711/118 |

FOREIGN PATENT DOCUMENTS

WO    2006012198 A1    2/2006

* cited by examiner

*Primary Examiner* — Matthew Bradley
*Assistant Examiner* — Daniel Tsui
(74) *Attorney, Agent, or Firm* — Yee & Associates, P.C.; James Nock (57) ABSTRACT

A write-back coherency data cache for temporarily holding cache lines. Upon receiving a processor request for data, a determination is made from a coherency directory whether a copy of the data is cached in a write-back cache located in a memory controller hardware. The write-back cache holds data being written back to main memory for a period of time prior to writing the data to main memory. If the data is cached in the write-back cache, the data is removed from the write-back cache and forwarded to the requesting processor. The cache coherency state in the coherency directory entry for the data is updated to reflect the current cache coherency state of the data based on the requesting processor's intended use of the data.

18 Claims, 4 Drawing Sheets

WRITE-BACK COHERENCY DATA CACHE FOR RESOLVING READ/WRITE CONFLICTS

BACKGROUND

1. Field

The disclosure relates generally to an improved data processing system, and more specifically to providing a write-back coherency data cache for temporarily holding cache lines in the process of being written back to main memory to resolve read/write conflicts and improve system performance.

2. Description of the Related Art

Memory bandwidth is a limiting factor with many modern microprocessors, and caches are typically employed to reduce the amount of memory traffic and decrease average access times in central processing unit (CPU) memory hierarchies, file systems, and so on. A cache is a smaller, faster memory bank that stores copies of the data from the most frequently used main memory locations. As many programs tend to access the same data or instructions over and over, maintaining as much of this information as possible in a cache allows the processor to avoid having to access the slower main memory of the data processing system to obtain the information.

Instructions and data are transferred from main memory to the cache in blocks, using some kind of look-ahead algorithm. The more sequential the instructions in the routine being executed or the more sequential the data being read or written, the greater chance the next required item will already be in the cache, resulting in better performance. When the processor needs to read from or write to a location in main memory, the processor first checks whether a copy of that data is in the cache. If so, the processor immediately reads from or writes to the cache, which is faster than reading from or writing to main memory.

SUMMARY

The illustrative embodiments provide a computer implemented method, data processing system, and computer program product for resolving read/write conflicts and improving system performance using a write-back coherency data cache that temporarily holds cache lines. The illustrative embodiments receive an access request from a requesting processor for a memory block. The illustrative embodiments check a coherency directory to determine if a copy of the memory block is cached in a write-back cache located in a memory controller hardware, wherein the write-back cache is used to hold memory blocks being written back to main memory for a period of time prior to writing the memory blocks to main memory, and wherein an entry in the coherency directory corresponding to the memory block comprises an address tag and current cache coherency state of the memory block. Responsive to a determination that the cache coherency state of the entry indicates that the memory block is in the write-back cache, the illustrative embodiments remove the memory block from the write-back cache and forwarding the memory block to the requesting processor. The illustrative embodiments update the cache coherency state in the entry in the coherency directory corresponding to the memory block to reflect the updated current cache coherency state of the memory block based on the requesting processor's intended use of the memory block.

DETAILED DESCRIPTION

As will be appreciated by one skilled in the art, aspects of the disclosure may be embodied as a system, method or computer program product. Accordingly, aspects of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems) and computer program products according to embodiments of the disclosure. It will be understood that each block of the flowchart illustrations and/or lock diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
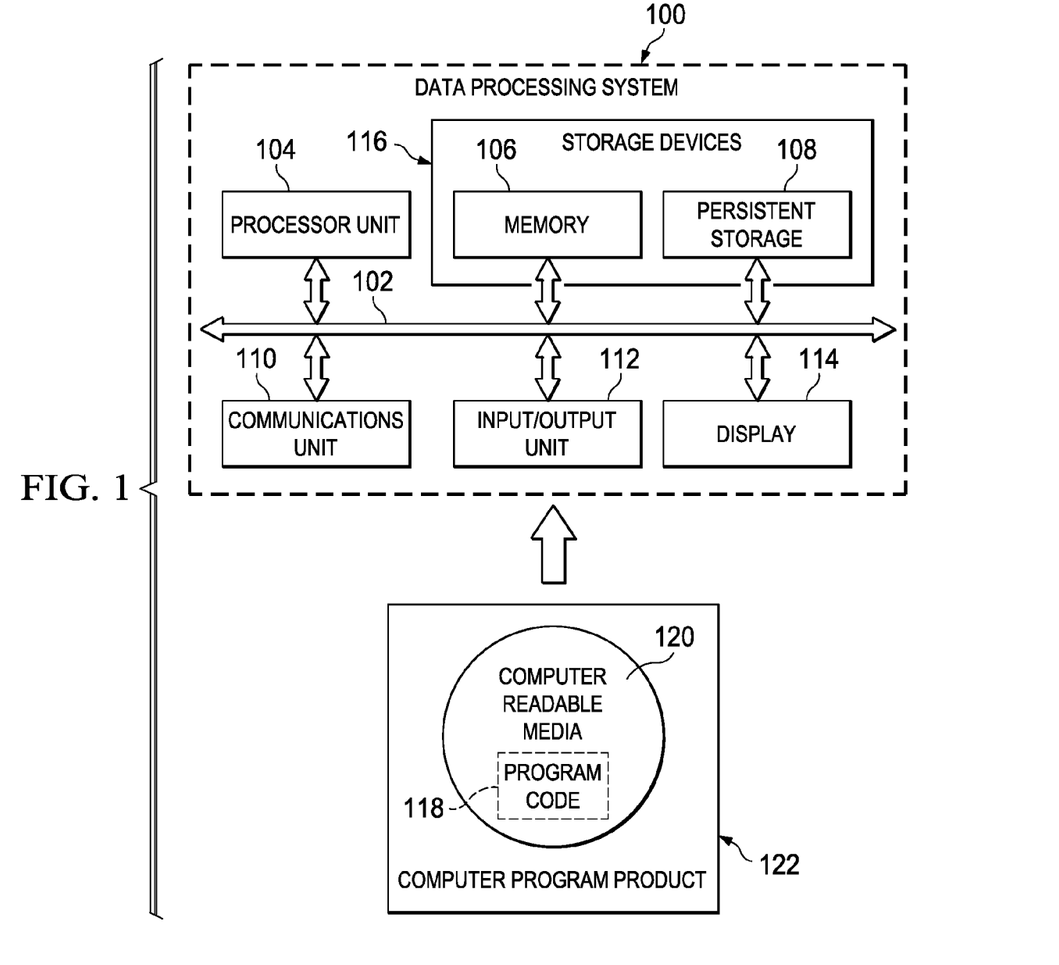
FIG. 1 is a block diagram of a data processing system in which the illustrative embodiments may be implemented.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

A microprocessor in a data processing system, such as processor 104 in FIG. 1, typically employs memory caches to reduce the average time required to access memory. Caches are typically Static Random Access Memory (SRAM), while main memory is generally some variety of Dynamic Random Access Memory (DRAM). Caches are smaller, faster memory banks that store copies of the data from the most frequently used main memory locations. When the processor needs to read from or write to a location in main memory, the processor first checks whether a copy of that data is in the cache. If so, the processor immediately reads from or writes to the cache, which is faster than reading from or writing to main memory.

When using caches among different processors in a symmetric multiprocessor platform (SMP) system, several copies of data may exist concurrently within the caches, and these copies may include a slightly different version of the data. Each copy of the data is referred to herein as either a memory block or a cache line. A distributed directory-based cache coherence scheme is commonly used to maintain coherence between the caches of different processors, all of which could theoretically hold a copy of the same memory block, in order to prevent read/write conflicts. An operation is in conflict with another operation if the operations are accessing the same data item and one of the operations is a write operation. A cache coherency directory comprises entries identifying memory blocks forwarded from main memory to a requesting processor. The coherency directory acts as a filter through which the processor must ask permission to forward an entry from main memory to the processor's cache. A coherency directory uses a cache coherence protocol that typically defines a set of cache states stored in association with the cache lines of each cache hierarchy, as well as a set of coherency messages utilized to communicate the cache state information between cache hierarchies of the different processors to maintain coherency. The cache coherence protocol is a process for, among other things, tracking which copy of the data is currently valid. The cache coherence protocol dictates which cache coherence protocol state is associated with each cache line. Therefore, at any given time, each cache line is in one of the cache coherence protocol "states". Examples of such coherence protocols include the MESI (modify, exclusive, shared, and invalid) protocol, MSI (modify, shared, and invalid) protocol, MOSI/MOESI (modify, owned, exclusive, shared, and invalid) protocol, and many others. The coherence protocol states are typically used as follows. A cache line may be marked in an Exclusive state in the coherency directory when requested data is forwarded to the processor and not modified. The state of the cache line may be changed to Shared if the same data is forwarded to another processor's cache. If one of the processors modifies the data, the data would be marked locally in the coherency directory as Modified, while the same cache line in the coherency directory of the other processor will be marked as Invalid.

The illustrative embodiments provide a computer implemented method, data processing system, and computer program product for improving data response times in SMP systems and resolve read/write conflicts among caches of different processors. A write-back coherency data cache is provided in the memory controller hardware to temporarily hold cache lines that are in the process of being written back to main memory. Holding the cache lines temporarily in the write-back cache before writing the data to main memory allows a subsequent request for the written data to retrieve the data held in the write-back cache faster than it would be to retrieve the written data from main memory, thereby reducing memory access latency. A coherency directory is also provided in the memory controller hardware to resolve read/write conflicts among data in the caches. The coherency directory tracks the contents of each cache in the hierarchy, including the write-back cache. As multiple processor cores may request write access to a same cache line of data, the coherency directory is used to maintain the synchronization of data in multiple caches to ensure at least a minimum level of coherence among the various processor core's "views" of the contents of system memory. The coherency directory also indicates the state of each cache line, including indicating the state of a cache line as being in the write-back process and held in the write-back cache (e.g., in a write-back (w) state). By holding a written cache line in a write-back cache for a period of time before releasing it to main memory and recording the state of a cache line in the coherency directory as in a write-back state, a processor making a request to access a data item may check the coherency directory and determine that the data is being held in the write-back cache rather than main memory. Consequently, the processor may retrieve the requested data from the write-back cache faster than it would be to obtain the data from main memory, as well as without experiencing any read/write conflicts. The write-back cache and coherency directory structure provide a method to store and track cache lines that are to be written to main memory and introduce a new wait (W) coherency state for cache lines. This combined solution differs from existing last level cache structures and coherency protocols which do not capture a W state nor give the capability of temporary storage and tracking of cache lines.

Figure 2:
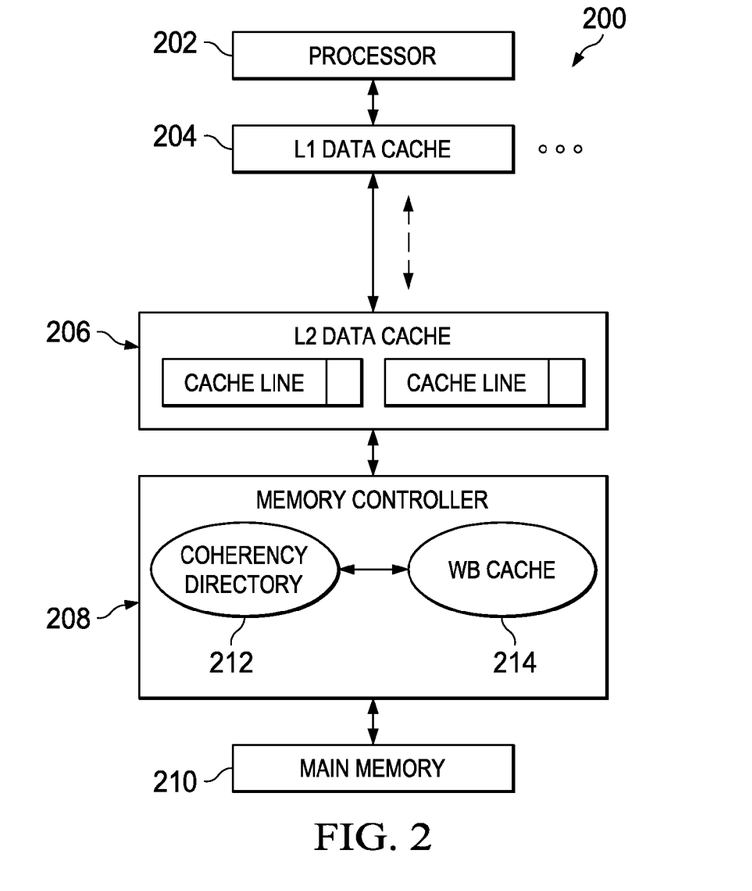
FIG. 2 is a block diagram illustrating components for implementing the write-back coherency cache scheme in accordance with the illustrative embodiments.

Turning now to FIG. 2, a diagram illustrating components for implementing the write-back coherency cache scheme is depicted in accordance with the illustrative embodiments. These components may be located in a data processing system, such as data processing system 100 in FIG. 1. In this illustrative example, data processing system 200 comprises processor 202, Level 1 cache 204, Level 2 cache 206, memory controller 208, and main memory 210. Those skilled in the art will appreciate that data processing system 200 can include many additional components that are not illustrated, such as interconnect bridges, non-volatile storage, ports for connection to networks or attached devices, etc. Because such additional components are not necessary for an understanding of the present invention, they are not illustrated in FIG. 2 or discussed further herein. It should also be understood, however, that the enhancements provided by the disclosure are applicable to cache coherent data processing systems of diverse architectures and are in no way limited to the generalized data processing system architecture illustrated in FIG. 2.

Processor node 202 is associated with main memory 210. Processor node 202 is an example of processor unit 103 in FIG. 1. Main memory 210 is an example of memory 106 in FIG. 1.

Level 1 cache 204 may be a fast memory chip that includes a small memory size, such as 64 kilobytes for instance. Generally, Level 1 cache 204 is sometimes referred to as a "primary cache." This cache is located between the processor, such as processor 202, and Level 2 cache 206. Depending on the implementation, Level 1 cache 204 may be integrated on the same integrated circuit as processor 202. Level 1 cache 204 also is more expensive compared to Level 2 cache 206, because of its faster access speed.

Level 2 cache 206, a secondary cache, is sometimes larger and slower than Level 1 cache 204. Level 2 cache 206 is generally located between the Level 1 cache 204 and main memory 210. When cache misses occur in Level 1 cache 204, processor 202 may attempt to retrieve data from Level 2 cache 206 prior to searching for the data in main memory 210. Unlike Level 1 cache 204, Level 2 cache 206 is often located external to the integrated circuit of processor 202 although, depending on the implementation, Level 2 cache 206 may be integrated on the same integrated circuit as processor 202.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache. Information in the caches may include instructions, data to be operated on by instructions, or a combination of the two.

When a processor modifies data contained within Level 1 cache 204 or Level 2 cache 206, the data written to the cache is also written to main memory. A write policy defines exactly when that data is written to the main memory. Two of the most commonly used cache write policies are the write-back approach and the write-through approach. The write-through approach means the data is written both into the cache and passed onto the next lower level in the memory hierarchy. The write-back approach means that data is initially only written to the cache, and only when a line that has been written to in the cache is replaced is the data transferred to a lower level in the memory hierarchy.

Memory controller 208 comprises coherency directory 212 and write-back cache 214. Memory controller 208 is an intelligent processing agent that manages coherency directory 212 and coordinates the exchange of coherency messages among processors. Each memory controller is connected so that it can communicate coherency messages with its peers on other processor nodes in the data processing system. Memory controller 208 keeps track of all external and local caching of memory blocks under its jurisdiction.

Coherency directory 212 is a directory structure used to keep track of all data that has been fetched from main memory 210 and to maintain cache coherency. Coherency directory 212 evaluates read and write requests pertaining to the processor's memory blocks and sends out coherency messages to all caches that maintain copies of data. For example, when a processor in the system updates a shared memory block, the directory having jurisdiction over the memory block is consulted to determine which caches hold copies of the block. Before the write operation can proceed, invalidation messages are sent to the identified caches and invalidation acknowledgements must be returned to verify that all cached copies have been invalidated. In similar fashion, when a processor requests read access to a shared memory block, the directory having jurisdiction over the block is consulted to identify the location and status of all cached copies. Based on the information in the directory, the requested block can be provided to the requester from one of the caches holding a valid copy, or from the main memory of the node that stores the block.

Write-back cache 214 is a cache located between the existing caches (e.g., Level 1 cache 204 and Level 2 cache 206) in data processing system 200 and is an extension of main memory 210. Write-back caching is a method in which modifications to data in an L1 or L2 cache are not copied to main memory until absolutely necessary. In contrast, write-through caching is a method in which all write operations are performed in parallel, such that data is written to main memory and the L1 or L2 cache simultaneously. Adhering to the write-back caching method, write-back cache 214 is used by memory controller 208 to temporarily hold cache lines that are in the process of being written back to main memory. These cache lines are held in write-back cache 214 for a certain period of time to enable subsequent requests for frequently requested data to fetch the data being held in the write-back cache faster than it would be to fetch the data from main memory. Thus, the access latency experienced by a processor when retrieving data from main memory may be reduced by retrieving the data being held in write-back cache 214 instead.

The particular cache lines contained within Level 1 cache 204, Level 2 cache 206, and the cache lines being written back to main memory and temporarily held in write-back cache 214 are recorded in coherency directory 212, which contains one directory entry for each cache line in a cache. Each entry in coherency directory 212 typically contains a tag corresponding to the address of a given memory block, identifying information for locating all processors that are caching the block, and a status field indicating the coherency state of a cache line. In a typical implementation, the cache state information takes the form of the well-known MESI protocol and reflects protocol-defined coherency state transitions in the cache hierarchy. However, with the write-back coherency cache scheme in the illustrative embodiments, existing protocols used to track the states of the cache lines are extended to include an additional cache state—the write-back state. A cache line tracked by coherency directory 212 is marked with a state indicator of "write-back" when the cache line is being held in write-back cache 214.

When a processor, such as processor 202, requests data, the processor first determines if the requested data is located in one of the caches by checking coherency directory 212. The processor accesses coherency directory 212 to obtain the address of the data in the cache and to determine the current state of the cached data (e.g., modified, exclusive, shared, invalid, write-back). When a processor, such as processor 202, is executing a particular instruction stream and needs a cache line to continue execution, the processor checks all levels of data cache internal to the processor and, upon a cache miss, sends a request for data to memory controller 208. This data request includes the address in memory where the data resides. Coherency directory 212 (which is embedded in the memory controller) has been tracking all cache line accesses by all processors in the system via an address tag list which includes coherency states for all cache lines accessed and the processor which requested the data. When the cache line request by the processor is received by coherency directory 212, the processor checks for an address match via the address tag list. If coherency directory 212 does not contain a cache line entry with an address tag matching the physical address of the requested data, the physical address is sent to the bus to obtain the data from main memory 210, and the data from memory is moved to a cache (e.g., Level 1 cache 204 or Level 2 cache 206) to be used by the processor. On the other hand, if the coherency directory 212 contains a cache line entry with an address tag matching the physical address of the requested data (i.e. another processor has previously fetched the requested data line and has the data line cached in an updated state), the processor checks the state indicator in the cache line entry to verify that the data is available to be retrieved from the cache, and if available, forwards the request to the owning processor and the owning processor forwards the data line to the requesting processor. If the state indicator in the cache line entry in coherency directory 212 indicates that the requested data is currently located within write-back cache 214, the processor may retrieve the data from the write-back cache 214.

Figure 3:
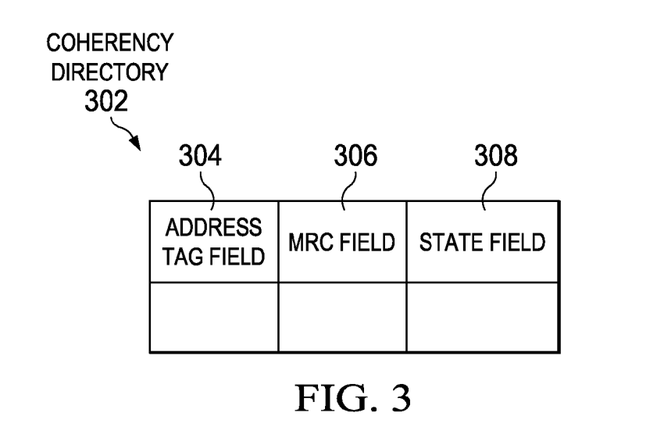
FIG. 3 is a block diagram of an exemplary embodiment of coherency directory in accordance with the illustrative embodiments.

With reference now to FIG. 3, a more detailed block diagram of an exemplary embodiment of coherency directory 212 in FIG. 2 is shown. Coherency directory 302 comprises a cache directory that keeps track of the state of all addresses that have been fetched from main memory by a processor(s). In these examples, each cache entry is a cache line. A cache line is an amount of data transferred between main memory and a cache through a cache line fill or write-back operation performed by the memory controller.

Each entry in coherency directory 302 comprises at least an address tag field 304, a most recently cached (MRC) field 306, and a state field 308. Address tag field 304 specifies the particular cache line stored in the Level 1 cache, the Level 2 cache, or the write-back cache utilizing a tag portion of the corresponding physical address of the data in main memory. MRC field 306 specifies the eviction order of the cache lines in the write-back cache. An MRC schema is used to determine the order in which the cache lines that are being temporarily held in the write-back cache should be released from the write-back cache and forwarded to main memory. In one embodiment, MRC field 306 may comprise a timestamp indicating when a cache line was cached into the writeback cache. Based on the timestamp in each entry in the write-back cache, the memory controller may evict cache lines from the write-back cache in chronological order (first in-first out). Thus, cache lines which have been most recently cached in the write-back cache (e.g., cache lines having a more recent timestamp) will be evicted from the write-back cache later than the previously cached cache lines. The MRC schema may also be configured such that at each eviction event, all of the cache lines having the earliest timestamp will be evicted from the write-back cache, regardless of the number of cache lines to be evicted. In an alternative embodiment, the MRC schema may be configured such that a defined number of cache lines (one or more) are evicted from the write-back cache at each eviction event. These cache lines may have the same timestamp or different timestamps, but all have been retained in the write-back cache longer or at least as long as the other remaining cache lines.

State field 308 comprises a value that indicates the current coherency state of the data in the cache. For example, the state field of an entry may indicate that the state of the memory block is in one of a modified, exclusive, shared, invalid, or write-back state. The state information is used by the coherency directory structure to specify what action (if any) a processor may take on a cache line.

When data being written back to main memory from the Level 1 or Level 2 cache is received at and temporarily held in the write-back cache, the memory controller updates MRC field 306 and state field 308 in the directory entry to reflect that the data is being held in the write-back cache for a period of time. For instance, the current value in state field 308 in coherency directory 302 may be updated with a "W" state to indicate the data is currently being held in the write-back cache. MRC field 306 is also updated with a value (e.g., a timestamp) indicating when the written data was cached in the write-back cache, thereby indicating when the written data should be evicted from the write-back cache and forwarded to main memory.

Figure 4:
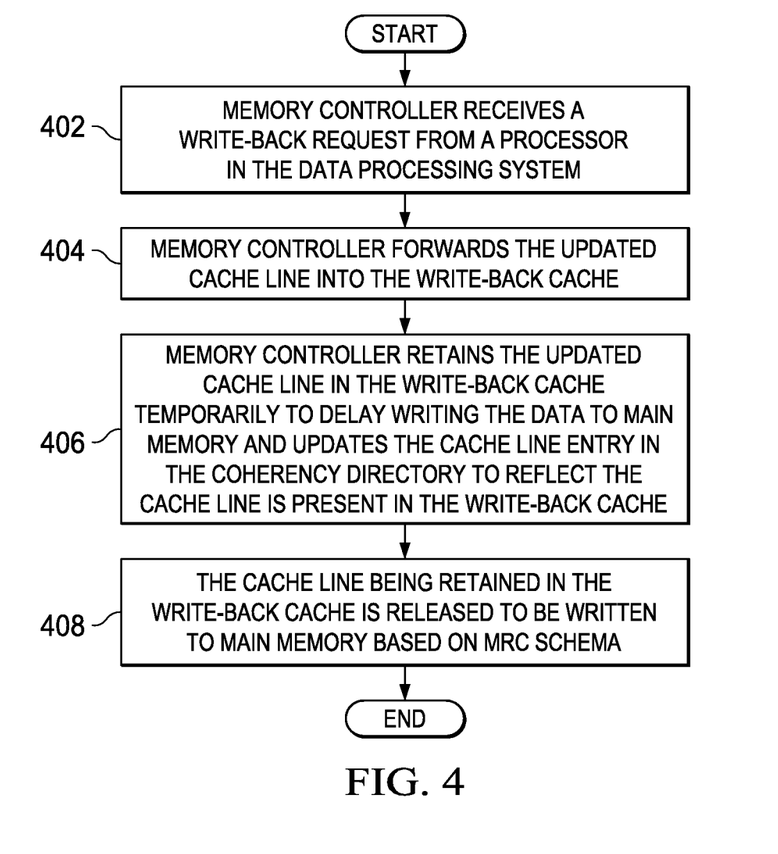
FIG. 4 is a flow diagram illustrating a sequence of actions that occur when a write-back request is received from a processor in accordance with the illustrative embodiments.

FIG. 4 is a flow diagram illustrating a sequence of actions that occur when a write-back request is received from a processor in accordance with the illustrative embodiments. The process described in FIG. 4 may be implemented in a data processing system, such as data processing system 200 in FIG. 2. The process begins with a memory controller, such as memory controller 208 in FIG. 2, receiving a memory write-back request from a processor in the data processing system, such as processor 202 (step 402). The memory write-back request comprises a request to write data that has been evicted from the processor's last level cache back to main memory. The memory write-back request includes a physical address which identifies the particular memory block in main memory to be updated.

Upon receiving the write-back request to write the updated data back to main memory, the memory controller forwards the updated cache line to the write-back cache (step 404). The updated cache line is held in the write-back cache for a period of time to delay writing the data to main memory in order to allow processors to access the written data from the write-cache faster than if the data was stored in main memory. The memory controller also updates the entry corresponding to the cache line in the coherency directory to reflect that the cache line is now located in the write-back cache (step 406). For example, the state field in the coherency directory entry may be updated to indicate the state of the cache line is in the "write-back" state. The MRC field in the coherency directory may also be updated to reflect the priority of cache lines to be retained in the write-back cache before being released to be written to main memory. The cache line with the lowest priority value in the MRC schema is released to be written to main memory (step 408).

Figure 5:
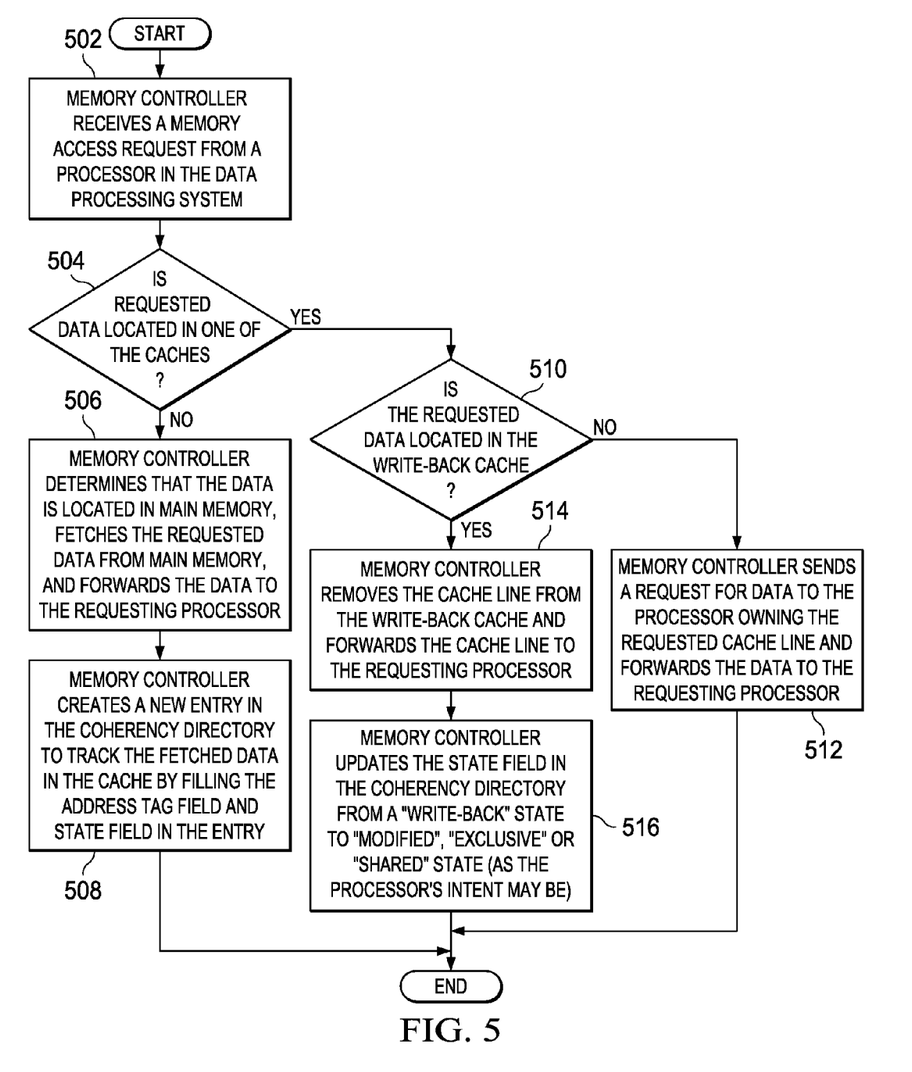
FIG. 5 is a flow diagram illustrating a sequence of actions that occur when a memory access request is received from a processor in accordance with the illustrative embodiments.

FIG. 5 is a flow diagram illustrating a sequence of actions that occur when a memory access request is received from a processor in accordance with the illustrative embodiments. The process described in FIG. 5 may be implemented in a data processing system, such as data processing system 200 in FIG. 2. The process begins with a memory controller, such as memory controller 208 in FIG. 2, receiving a memory access request from a processor in the data processing system, such as processor 202 (step 502). The memory access request comprises a request to either read or write data. The memory access request includes a physical address which identifies the particular memory block in main memory to be accessed.

Upon receiving the memory access request, the memory controller first checks the coherency directory to determine if the requested data is located in one of the caches (step 504). The memory controller may make this determination by checking the entries in the directory to locate an address tag that corresponds to the physical address in the request exists. If there is no entry that matches the physical address in the request ('no' output of step 504), the memory controller determines that the data is located in main memory, fetches the requested data from main memory, and forwards the data to the requesting process (step 506). The memory controller also creates a new entry in the coherency directory to track the fetched data in the cache by filling the address tag field and state field in the entry (step 508). For instance, the address tag field may comprise a tag portion of the corresponding physical address of the data block and the state field may be set with an Exclusive or Shared state, as the case may be.

Turning back to step 504, if there is an entry in the coherency directory that matches the physical address in the request ('yes' output of step 504), the memory controller checks the state field in the entry to determine whether the requested data is located in the write-back cache (step 510). If the requested data is not located in the write-back cache (i.e., the requested data is located in Level 1 or Level 2 cache) ('no' output of step 510), the memory controller sends a request for data to the processor owning the requested cache line and that data is forwarded to the requesting processor (step 512). However, if the requested data is located in the write-back cache ('yes' output of step 510), the memory controller provides the cache line to the requesting processor (step 514). The memory controller also updates the state field in the coherency directory from a "write-back" state to an "exclusive", "modified", or "shared" state (as the case may be) and clears the time duration field (step 516).

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the disclosure has been presented for purposes of illustration and description, but is not intended to be exhaustive or limited to the embodiments of the disclosure in the forms disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The embodiments of the disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the embodiments of the disclosure can take the form of a computer program product accessible from a computer readable medium providing program code for use by or in connection with a computer or any instruction execution system. For the purposes of this description, a computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the embodiments of the disclosure has been presented for purposes of illustration and description, and is not intended to be exhaustive or limited to the embodiments of the disclosure in the forms disclosed. Many modifications and variations will be apparent to those of ordinary skill in the art. The embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method for temporarily holding cache lines, the computer implemented method comprising:
    configuring a write-back cache between different processors and a main memory in a symmetric multiprocessor platform system, wherein the write-back cache is located in a memory controller and is associated with a coherency directory;
    storing and retaining, by the memory controller, responsive to a cache line in a cache of one of the different processors being ready to be written back to the main memory from the cache, the cache line in the write-back cache to delay writing the cache line back to the main memory for a designated period of time and associating the cache line with a "write back (W)" state in the coherency directory to indicate that writing back to main memory of the cache line is delayed for the designated period of time and the cache line is present in the write back cache;
    prior to the expiration of the designated period of time, receiving an access request from a requesting processor for the cache line;
    checking, responsive to receiving the access request prior to the expiration of the designated period of time and to determining that the cache line is not in any data caches of the different processors, checking the coherency directory to determine if the "write back (W)" state in the coherency directory indicates that writing back of the cache line to main memory is delayed and that the cache line is present in the write back cache;
    removing, responsive to a determination that the "write back (W)" state of the cache line indicates that writing back of the cache line to the main memory is being delayed and the cache line is present in the write-back cache the cache line from the write-back cache and forwarding the cache line to the requesting processor; and
    updating the cache coherency state of the cache line in the coherency directory based on the requesting processor's intended use of the cache line to form an updated cache coherency state of the cache line.

2. The computer implemented method of claim 1, further comprising:
    responsive to a determination that the cache coherency state of the entry does not indicate that the memory block is in the write-back cache, sending the access request for the memory block to a processor owning the requested cache line; and
    forwarding the memory block to the requesting processor.

3. The computer implemented method of claim 1, wherein the updated cache coherency state is one of a modify (M) state, exclusive (E) state, or shared (S) state, and wherein the updated cache coherency state reflects the requesting processor's intended use of the memory block.

4. The computer implemented method of claim 1, wherein the entry in the coherency directory includes a priority value used to determine when the memory block should be evicted from the write-back cache and written back to main memory.

5. The computer implemented method of claim 4, wherein the priority value is a timestamp.

6. The computer implemented method of claim 1, wherein memory blocks in the write-back cache are evicted from the write-back cache in an order in which the memory blocks are written to the write-back cache.

7. The computer implemented method of claim 4, further comprising:
    responsive to a determination that the priority value is a lowest priority value in the write-back cache, evicting the memory block from the write-back cache and writing the memory block to main memory.

8. The computer implemented method of claim 1, wherein the write-back cache is an extension of main memory.

9. A non-transitory computer program product for temporarily holding cache lines in a write-back coherency data cache, the computer program product comprising:
    a computer readable storage device having computer readable program code stored thereon, the computer readable program code for execution by a computer, comprising:
    computer readable program code stored in the computer readable storage device for configuring a write-back cache between different processors and a main memory in a symmetric multiprocessor platform system, wherein the write-back cache is located in a memory controller and is associated with a coherency directory;
    computer readable program code stored in the computer readable storage device for storing and retaining, by a memory controller responsive to a cache line in a cache of one of the different processors being ready to be written back to the main memory from the cache, the cache line in the write-back cache to delay writing the cache line back to the main memory for a designated period of time and associating the cache line with a "write back (W)" state in the coherency directory to indicate that writing back to main memory of the cache line is delayed for the expiration of the designated period of time and the cache line is present in the write back cache;
    computer readable program code stored in the computer readable storage device for receiving, prior to the expiration of the designated period of time, an access request from a requesting processor for the cache line;
    computer readable program code stored in the computer readable storage device for checking, responsive to receiving the access request prior to the expiration of the designated period of time and to determining that the cache line is not in any data caches of the different processors, the coherency directory to determine if the "write back (W)" state in the coherency directory indicates that writing back of the cache line to main memory is delayed and that the cache line is present in the write back cache;
    computer readable program code stored in the computer readable storage device for removing, responsive to a determination that the "write back (W)" state of the cache line indicates that writing back of the cache line to the main memory is being delayed and the cache line is present in the write-back cache, the cache line from the write-back cache and forwarding the cache line to the requesting processor; and computer readable program code stored in the computer readable storage device for updating the cache coherency state of the cache line in the coherency directory based on the requesting processor's intended use of the cache line to form an updated cache coherency state of the cache line.

10. The computer program product of claim 9, further comprising:
computer readable program code for, in response to a determination that the cache coherency state of the entry does not indicate that the memory block is in the write-back cache, sending the access request for the memory block to a processor owning a requested cache line; and
computer readable program code for forwarding the memory block to the requesting processor.

11. The computer program product of claim 9, wherein the updated cache coherency state is one of a modify (M) state, exclusive (E) state, or shared (S) state, and wherein the updated cache coherency state reflects the requesting processor's intended use of the memory block.

12. The computer program product of claim 9, wherein the entry in the coherency directory includes a priority value used to determine when the memory block should be evicted from the write-back cache and written back to main memory.

13. The computer program product of claim 12, wherein the priority value is a timestamp.

14. The computer program product of claim 9, wherein memory blocks in the write-back cache are evicted from the write-back cache in an order in which the memory blocks are written to the write-back cache.

15. The computer program product of claim 12, further comprising:
computer readable program code for, in response to a determination that the priority value is a lowest priority value in the write-back cache, evicting the memory block from the write-back cache and writing the memory block to main memory.

16. The computer program product of claim 10, wherein the write-back cache is an extension of main memory.

17. An apparatus comprising:
a bus;
a storage device connected to the bus, wherein the storage device contains computer usable code;
at least one managed device connected to the bus;
a communications unit connected to the bus; and
a processing unit connected to the bus, wherein the processing unit executes the computer usable code to:
configure a write-back cache between different processors and a main memory in a symmetric multiprocessor platform system, wherein the write-back cache is located in a memory controller and is associated with a coherency directory;
store and retain, by a memory controller responsive to a cache line in a cache of one of the different processors being ready to be written back to the main memory from the cache, the cache line in the write-back cache to delay writing the cache line back to the main memory for a designated period of time and associating the cache line with a "write back (W)" state in the coherency directory to indicate that writing back to main memory of the cache line is delayed for the designated period of time and the cache line is present in the write back cache;
prior to the expiration of the designated period of time, receive an access request from a requesting processor for the cache line;
check, responsive to receiving the access request prior to the expiration of the designated period of time and to determining that the cache line is not in any data caches of the different processors, the coherency directory to determine if the "write back (W)" state in the coherency directory indicates that writing back of the cache line to main memory is delayed and that the cache line is present in the write back cache;
remove, responsive to a determination that the "write back (W)" state of the cache line indicates that writing back of the cache line to the main memory is being delayed and the cache line is present in the write-back cache, the cache line from the write-back cache and forwarding the cache line to the requesting processor; and
update the cache coherency state of the cache line in the coherency directory based on the requesting processor's intended use of the cache line to form an updated cache coherency state of the cache line.

18. The apparatus of claim 17, wherein the updated cache coherency state is one of a modify (M) state, exclusive (E) state, or shared (S) state, and wherein the updated cache coherency state reflects the requesting processor's intended use of the memory block.

* * * * *